June 19, 1951 H. N. BAKER 2,557,588
PLOW BOTTOM
Filed Aug. 6, 1945
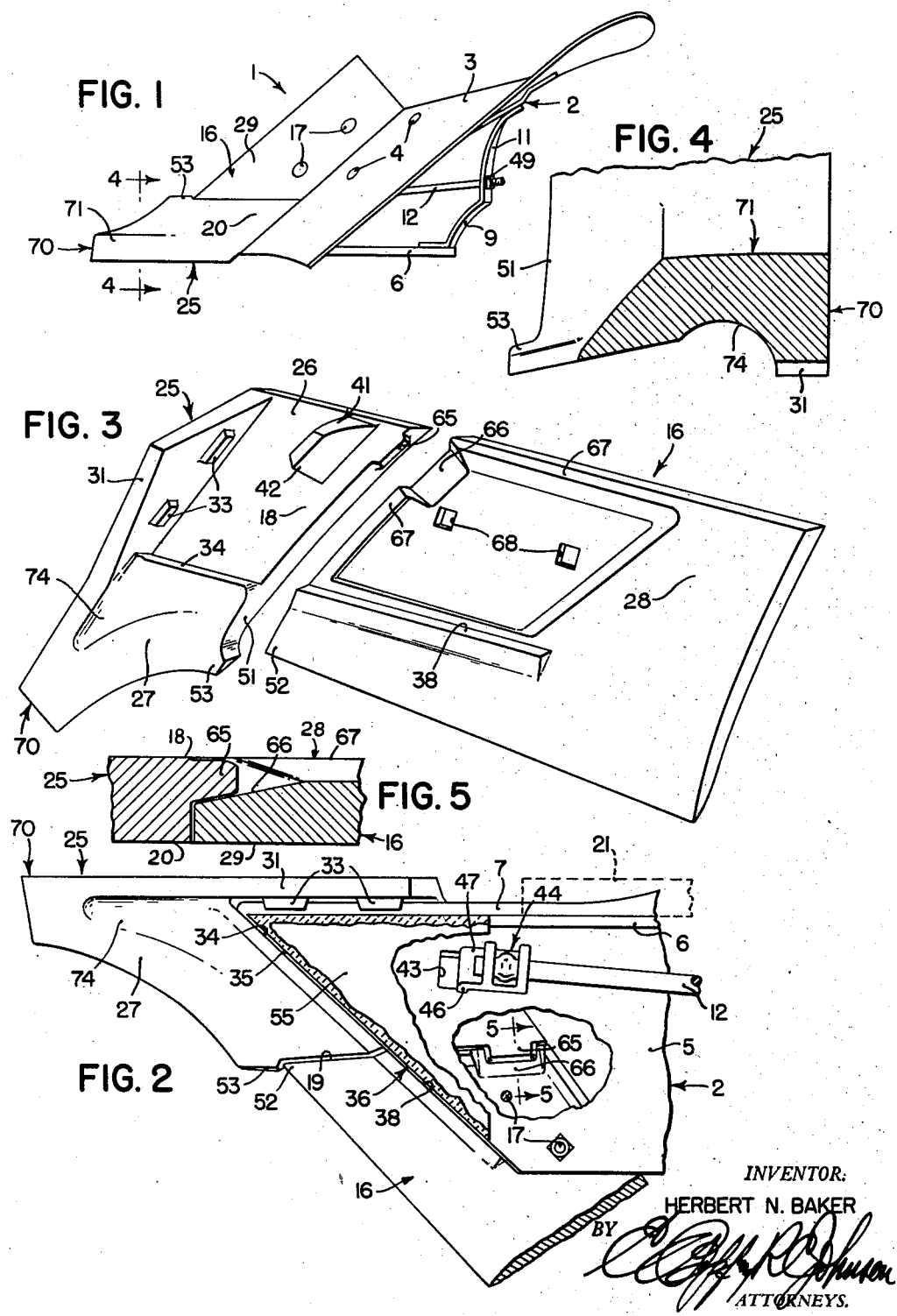
INVENTOR:
HERBERT N. BAKER
BY
ATTORNEYS.

Patented June 19, 1951

2,557,588

UNITED STATES PATENT OFFICE 2,557,588

PLOW BOTTOM

Herbert N. Baker, Syracuse, N. Y., assignor to Syracuse Chilled Plow Co., Inc., Syracuse, N. Y., a corporation of New York Application August 6, 1945, Serial No. 609,074

2 Claims. (Cl. 97—125)

This invention relates generally to agricultural implements and more particularly to plows and other earth working tools.

The object and general nature of the present invention is the provision of certain new and useful improvements in plows of the type having a detachable and replaceable plow point, and it is also an important feature of this invention to provide a novel plow frog, a novel plow point, and a novel wing or share blade, all particularly constructed to facilitate attaching the same to complete the plow bottom and to improve the operating efficiency of the latter as a whole.

More specifically, it is a feature of this invention to provide a plow having improved clamping means for holding the plow point in position firmly and rigidly on the frog. In this connection, it is a further feature of this invention to provide auxiliary interlocking means between the detachable and replaceable plow point and the wing or share which serves to prevent the point from being pulled away from the point holding means if, for example, the plow point should strike an obstruction. More specifically, it is a feature of this invention to provide a lug on the rear end of the plow point engaging in a socket or recess on the adjacent portion of the wing serving as reenforcing means for relieving the clamping means from some of the loads to which it would otherwise be subjected.

It is a further feature of this invention to provide an improved plow point having a reenforced nose constructed and arranged so that, notwithstanding the reenforcement, the nose of the share may be easily and conveniently chilled to the desired depth and thus secure the proper amount of hardening in the casting and manufacture of the plow point.

These and other objects and advantages of the present invention will be apparent to those skilled in the art after a consideration of the following detailed description, taken in conjunction with the accompanying drawings.

In the drawings:

Figure 1 is a top or plan view of a plow bottom in which the principles of the present invention have been incorporated.

Figure 2 is a fragmentary enlarged bottom view.

Figure 3 is a perspective view of the underside of the plow point and the adjacent portions of the wing or share blade.

Figures 4 and 5 are sectional views taken, respectively, along the line 4—4 and 5—5 of Figures 1 and 2.

Referring now to the drawings, more particularly to Figures 1 and 2, the plow bottom which I have chosen to illustrate the present invention is indicated in Figure 1 in its entirety by the reference numeral 1 and comprises a frog 2 which generally serves as the supporting means for the other parts, a moldboard 3, bolted, as at 4, to the moldboard-receiving plate 5 of the frog 2. For purposes of clarity the moldboard has been omitted in Figure 2. The frog 2 also includes a landside plate 6 welded to the plate 5 a short distance laterally inwardly of the landward edge 7 of the moldboard plate 5 so as to provide a flange or overhanging construction with which the point, to be described below, particularly cooperates. A brace 9 is fixed, as by welding, to the landside plate 6 and to the moldboard-receiving plate 5, and the intermediate portion 11 of the brace 9 is provided with a section that is apertured to receive the rear portion of a clamping bolt 12, to which detailed reference will be made below.

The plow bottom 1 also includes a wing or share blade 16 that is bolted, as at 17, to the lower forward portion of the frog, particularly the moldboard-receiving plate 5 thereof, the wing or blade 16, in effect, forming a continuation of the upper surface of the moldboard 3. The wing or blade 16 includes a lower frog-receiving surface 28 (Figure 3), an upper earth-engaging surface 29 (Figure 1), and a landside edge 19 which is spaced laterally from the landside face or edge of the moldboard and generally in a furrowward direction from the plane of the landside 21 of the plow. The landside 21 is bolted to the lower rear portion of the landside plate 6 of the frog.

A separate detachable and replaceable plow point 25 is fixed to the forwardmost portion of the frog 2 and, as best shown in Figure 3, comprises a flat main body section 26 having a thicker forward portion 27, a lower frog-engaging surface 18, an upper earth-engaging surface 20 (Figure 1), and a point or soil entering nose portion 70. The plow point 25 also is provided with a flange 31 disposed in a plane generally parallel to the landside plate 6, when the point is attached to the plow. The plane of the main body section 26 of the point 25 makes an acute angle with respect to the plane of the plow point landside flange 31. The latter is provided with a pair of lugs 33 spaced below (above in Figure 3) the face of the rear portion of the plow point, the spacing being such that the landward edge 7 of the frog may be received therebetween.

Between the sections 26 and 27 of the point 25 there is an abutment shoulder 34 which lies in a line making an acute angle with respect to the plane of the landside flange 31. The abutment edge 34 is adapted to engage the landward portion 35 of the forward edge 36 of the frog. The wing 16 has a similar rearwardly facing shoulder 38 which, when the wing is secured in place to the frog, engages the forward edge 36 of the frog furrowwardly of the point 25. As best shown in Figure 2, the two abutment shoulders 34 and 38 are normally in alignment.

As best shown in Figure 3, the under side of the plow point 25, adjacent the rear and furrowward edges, has a lug 41 having an undercut surface 42. This lug is adapted, when the point 25 is mounted in position on the frog, to extend through an opening 43 in the forward portion of the moldboard-receiving plate 5 of the frog 2, the opening 43 being disposed fairly close to the landside plate 6 of the frog. Cooperating with the lug 41 is a clamping bolt lug 44 having an undercut surface engaging the portion 42 of the lug 41 and a pair of opposite shoulders 46 and 47 which engage the under side of the frog plate 5. The rear end of the clamping bolt 12 is threaded and receives one or more nuts 49 which, when tightened, react against the brace 9, drawing the bolt 12 generally rearwardly and not only pulling rearwardly but also downwardly against the point 25, holding the latter against the upper face of the frog 2, the shoulders 46 and 47 bearing against the lower face of the frog at opposite sides of the opening 43. It will be noted that the bolt 12 is arranged at an angle to the plane of the landside plate so that the pull exerted by the bolt on the point 25 has a certain amount of laterally directed force component acting to hold the point 25 snugly against the landward edge 7 of the frog. Thus, the lugs 33 are held fully engaged over the landward edge 7. Furthermore, since the abutment shoulder 34 on the point 25 is at an angle to the landside flange 31, when the bolt 12 is tightened the shoulder 34 is pulled against the forward edge 35 of the frog. This serves further to cause the point 25 to be drawn laterally inwardly as well as rearwardly relative to the frog. Thus, the point 25 is securely held in position by what amounts to substantially a direct pull by the clamping bolt 12, the lug 44 thereof reacting against the frog for holding the point down against the upper face of the frog and, at the same time, holding the point 25 in its laterally biased position with the lugs 33 engaged over the landside edge of the frog. As best shown in Figure 3, the furrowward edge of the point 25 is beveled, as at 51, and overhangs the beveled end 19 of the blade 16, and the bolt 12 when tightened securely holds these edges together. Preferably, the landward corner 52 of the wing lies behind an extension 53 of the plow point 25, and the shoulder 38 on the wing 16, bearing against the forward edge of the frog, serves to prevent the wing 16 from being forced rearwardly out of position.

In order to protect the lug 44 and associated parts, a sole plate 55 is welded or otherwise secured to the forward portion of the landside plate 6 and the lower edge of the moldboard-receiving plate 5, preferably along the edge section 35. This sole plate also reenforces the frog parts.

Under some situations where the operating conditions are rather severe, as, for example, where frequent obstructions are encountered, there may be a tendency for the front end of the point 25 to rock downwardly about the front portion of the frog as a fulcrum, disengaging the lug 41 on the point member 25 from the holding lug 44, even though the bolt 12 is fairly tight. In order to prevent such accidental disconnection of the point 25, I provide an auxiliary lug 65 on the rear and furrowward side of the point member 25, between the upper and lower surfaces 20 and 18, and a cooperating lug-receiving recess 66 on the adjacent portion of the wing 16, between the upper and lower surfaces 29 and 28 of the wing. Preferably, the recess 66 is formed adjacent the rear landward corner of the wing 16, being constructed generally as an interruption in the flange 67 that, in this form of the invention, extends generally along the rear and landward margins of the wing 16 on the underside thereof. Openings 68 in the wing 16 receive the clamping bolts 17. By disposing the lug 65 and recess 66 above the frog-engaging surfaces of the wing and point, they do not interfere with the secure attachment of the point and wing to the frog 2. The recess 66 is sufficiently longer than the length of the lug 65 so that when the bolt 12 is loosened, the point 25 may be slid forwardly along the edge 35 a distance sufficient to permit the point 25 to be moved landwardly and to permit the lugs 33 clearing the edge 7 of the frog plate 5, whereby the point may then be readily disconnected from the plow bottom without loosening the wing 16.

The nose portion 70 of the point member 25 is provided with a thickened section 71 which imparts additional strength to the point member. In order, however, that this portion of the point member have the requisite hardness, secured usually by the use of chills during the casting operation, the thickened nose portion 71 is provided on the under side with a recessed portion 74 which receives a part of the chill during the casting operation so that the metal of the point member is chilled to a sufficient depth upwardly from the recess 74 toward the upper surface of the thickened nose portion.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use in a plow including a frog having an upper surface, a landward edge, and a forward edge extending rearwardly and furrowwardly at an acute angle to said landward edge, the improvement comprising a wing adapted to be fixed to said frog in a position with the landward edge of the wing spaced from the landward edge of said frog, said wing having a lug-receiving recess in the landward edge of the wing, and a detachable plow point comprising a member having at one side a landside adapted to engage the landward edge of said frog, an upper earth-engaging surface, a lower frog-engaging surface, a shoulder extending rearwardly at the aforesaid angle to said landside and adapted to engage the forward edge of said frog, and a wing-engaging lug on the edge of said member opposite said landside and adapted to seat in said recess when the landside of said point member engages the landward edge of the frog, said point member also having lug means thereon adapted to engage underneath the landward edge of said frog when the frog-engaging surface of the point member lies against the upper surface of the frog, said wing-engaging lug being disposed at an angle to said shoulder, and said lug-receiving recess of said wing being larger than said wing-engaging lug in a generally fore and aft direction, whereby said wing-engaging lug is movable in a generally fore and aft direction in said lug-receiving recess of the wing until the plow point has been shifted along the forward edge of the frog a distance sufficient to fully engage the lug means on said point member with the landward edge of the frog or completely disengage said lug means from the landward edge of the frog.

2. For use in a plow including a frog having an upper surface, a landward edge, and a forward edge extending rearwardly and furrowwardly at an acute angle to said landward edge, the improvement comprising a wing adapted to be fixed to said frog in a position with the landward edge of the wing spaced from the landward edge of said frog, said wing having a lug-receiving recess in the landward edge of the wing, and a detachable plow point comprising a member having at one side a landside adapted to engage the landward edge of said frog, an upper earth-engaging surface, a lower frog-engaging surface, a shoulder extending rearwardly at the aforesaid angle to said landside and adapted to engage the forward edge of said frog, and a wing-engaging lug on the edge of said member opposite said landside and adapted to seat in said recess when the landside of said point member engages the landward edge of the frog, said point member also having lug means thereon adapted to engage underneath the landward edge of said frog when the frog-engaging surface of the point member lies against the upper surface of the frog, said wing-engaging lug on the point member and the lug recess of said wing being so shaped, relative to said shoulder on the point member and the forward edge of said frog, so as to provide for movement of said point member along the forward edge of said frog a distance sufficient to fully engage the lug means on said point member with the landward edge of the frog or completely disengage said lug means from the landward edge of the frog.

HERBERT N. BAKER.

REFERENCES CITED

The following references are of record in the file of this patent:

UNITED STATES PATENTS

| Number | Name | Date |
|---|---|---|
| 277,185 | Anderson | May 8, 1883 |
| 1,123,618 | Stopp | Jan. 5, 1915 |
| 1,511,301 | Sanders | Oct. 14, 1924 |
| 2,031,548 | Romine et al. | Feb. 18, 1936 |
| 2,335,977 | Thomas | Dec. 7, 1943 |
| 2,347,167 | Baker | Apr. 25, 1944 |